Sept. 2, 1924.
S. G. NOTTAGE
PHASE MODIFYING SYSTEM
Filed May 23, 1919
1,506,770
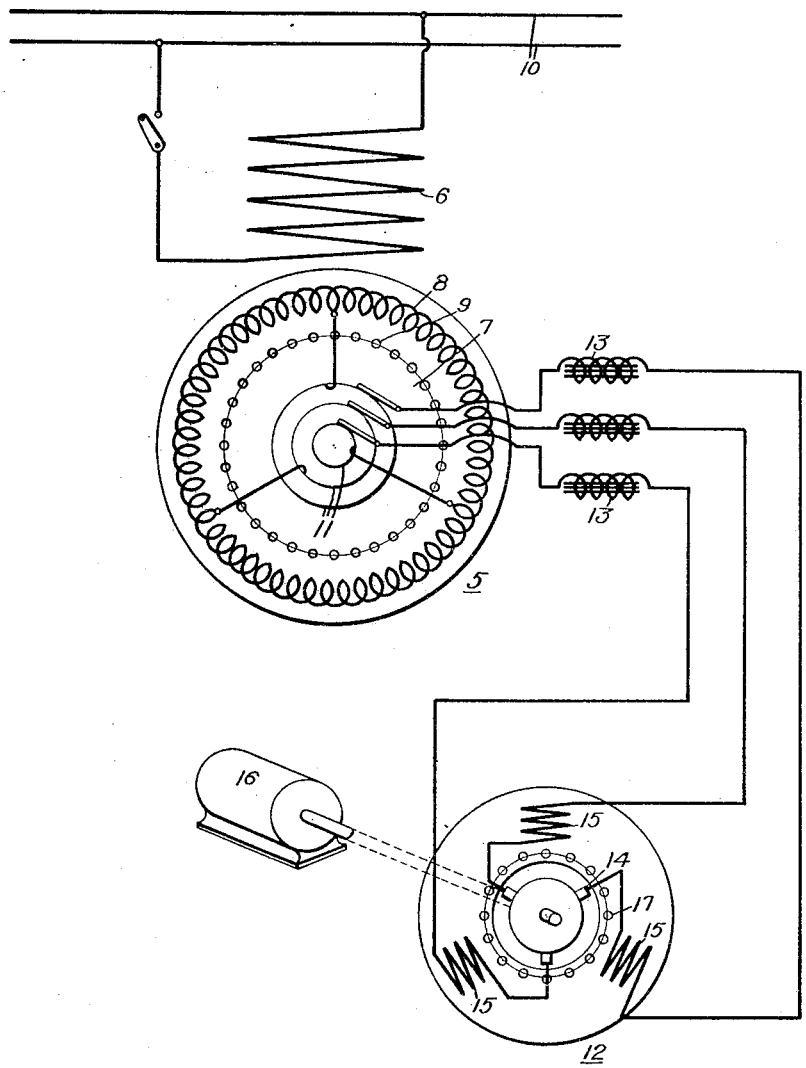
WITNESSES:
J. A. Helsel
D. C. Davis
INVENTOR
Stanley G. Nottage.
BY
ATTORNEY Patented Sept. 2, 1924.

1,506,770

UNITED STATES PATENT OFFICE.

STANLEY G. NOTTAGE, OF MURRAYSVILLE, PENNSYLVANIA, ASSIGNOR TO WESTING-HOUSE ELECTRIC & MANUFACTURING COMPANY, A CORPORATION OF PENNSYLVANIA.

PHASE-MODIFYING SYSTEM.

Application filed May 23, 1919. Serial No. 299,162.

*To all whom it may concern:*

Be it known that I, STANLEY G. NOTTAGE, a citizen of the United States, and a resident of Murraysville, in the county of Westmoreland and State of Pennsylvania, have invented a new and useful Improvement in Phase-Modifying Systems, of which the following is a specification.

My invention relates to phase-modifying systems particularly adapted for operation with single-phase apparatus, and it has for its object to provide apparatus of the character designated that shall permit the operation of a phase-advancer of the commutator type with relatively good commutation, at the same time permitting satisfactory operation of the single-phase apparatus under control.

The single figure of the accompanying drawing is a diagrammatic view of a single-phase dynamo-electric machine of the induction type, together with supply and phase-modifying circuits, embodying a preferred form of my invention.

In the operation of a single-phase induction motor at a slightly under synchronous speed, it is well known that electromotive forces of slip frequency and of double-synchronism-minus-slip appear in the rotor winding. That this is so is readily apparent from a consideration of the fact that any oscillating function may be resolved into two oppositely rotating functions of like frequency and each having a maximum value of one-half of that of the oscillating function. Thus, the single-phase field of a single-phase induction motor may be considered as resolved into two oppositely rotating fields, each rotating at synchronous speed. The movement of the rotor at slightly under synchronous speed causes it to cut the forwardly rotating field at slip speed, generating currents of slip frequency, and causes it to cut the backwardly rotating field at double-frequency-minus-slip speed, producing corresponding currents.

A corresponding phenomenon is present to a lesser degree in any polyphase motor operating from an unbalanced system, since any unbalanced polyphase function may be resolved into two oppositely rotating balanced functions, as fully proved in an article by Chas. LeG. Fortescue and E. Gilman appearing on page 1431 of the Proceedings of the American Institute for Electrical Engineers for September, 1916.

In the improvement of the power-factor of a motor, it is desirable to operate with only the low-frequency secondary currents and it is accordingly desirable to segregate these two systems of currents so far as possible.

In accordance with the present invention, I preferably provide the rotor member of an induction machine with two distinct windings, namely, an ordinary polyphase winding lying in the upper portions of the slots and a squirrel-cage winding lying in the lower portions of the slots. The low frequency currents largely center in the polyphase winding and the high-frequency currents largely in the squirrel-cage winding. I may then tap the polyphase winding off to a phase-advancer, as of the Le Blanc type, preferably through choke coils, so as to keep back the high-frequency secondary currents, and I may further apply certain damping means to the phase-advancer to largely neutralize the harmful effects of high-frequency currents therein.

Referring to the drawing for a more detailed understanding of my invention, I show a single-phase induction motor at 5 comprising a single-phase field 6 and a rotor 7 provided with a polyphase winding 8 overlying a squirrel-cage winding 9.

The field or primary winding 6 may be energized, as from single-phase supply mains 10. The winding 8 is symmetrically attached to slip rings 11, and brushes, bearing thereupon, are connected to the terminals of a three-phase, phase-advancer 12 of the Le Blanc type, preferably through choke coils 13—13. The phase-advancer 12, as is well known, embodies symmetrically disposed brushes 14 bearing upon the commutator cylinder of a rotating armature, the leads to these brushes traversing appropriately disposed field windings 15—15 so as to generate a phase-modifying electromotive force of the appropriate phase position. If desired a Le Blanc phase-advancer of the unwound stator type may be employed, as is well known in the art.

The phase-modifier 12 may be driven at any desired speed, as by a motor 16, and is further provided with a closed damping winding 17 on the stator thereof, for a purpose to be hereinafter specified.

In operation, single-phase current is supplied to the primary winding 6, and the rotor 5 is started in any desired manner, as employed with single-phase motors. Substantially all high-frequency currents center in the squirrel-cage winding 9 because of its relatively low impedance, whereas the major portion of the low-frequency currents center in the phase winding 8, since this winding cuts the forwardly rotating field more effectively. The combined high and low-frequency currents existing in the winding 8, however, tend to flow to the advancer but substantially all high-frequency currents are choked back by the reactance devices 13—13. Such high-frequency currents as do reach the phase-advancer 12, however, with the accompanying tendency to produce high-frequency pulsating fields therein and the production of high electromotive forces in the short-circuited armature coils undergoing commutation are largely damped by the closed stator winding 17. The low-frequency currents, on the other hand, readily traverse the devices 13—13 and the phase-advancer 12, producing the desired corrective electromotive forces therein to neutralize the current-lagging effect of the induction motor 5. In the following claims, I shall employ the term "induction" as excluding alternating-current commutator motors and generators.

While I have shown my invention in its preferred form, it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:—

1. A dynamo-electric machine of the induction type, including relatively rotating primary and secondary members, means for energizing said primary member in such manner that oppositely rotating component symmetrical fields are produced, whereby high-frequency and low-frequency currents will be generated in said secondary member, means for substantially segregating said secondary currents in different paths, and means for modifying the phase of the low-frequency currents without appreciably modifying the phase of the high-frequency currents.

2. A dynamo-electric machine of the induction type, including relatively rotating primary and secondary members, means for energizing said primary member in such manner that oppositely rotating component symmetrical fields are produced, whereby high-frequency and low-frequency currents will be generated in said secondary member, said secondary member being provided with two distinct windings, the magnetic and electrical characteristics of said windings being such that substantially all the low-frequency currents localize in one winding and substantially all the high-frequency currents localize in the remaining winding, an external circuit connected to one of said windings, phase-modifying apparatus therein, and means for largely preventing the circulation of currents of the other frequency through said external circuit.

3. A dynamo-electric machine of the induction type, including relatively rotating primary and secondary members, means for energizing said primary member in such manner that oppositely rotating component symmetrical fields are produced, whereby high-frequency and low-frequency currents will be generated in said secondary member, said secondary member being provided with two distinct windings, the magnetic and electrical characteristics of said windings being such that substantially all the low-frequency currents localize in one winding and substantially all the high-frequency currents localize in the remaining winding, an external circuit connected to the winding which is the seat of low-frequency currents, phase-modifying apparatus in said external circuit, and inductive devices therein which largely prevent the circulation of high-frequency currents therethrough.

4. A dynamo-electric machine of the induction type, including relatively rotating primary and secondary members, means for energizing said primary member in such manner that oppositely rotating component symmetrical fields are produced, whereby high-frequency and low-frequency currents will be generated in said secondary member, said secondary member being provided with two distinct windings, the magnetic and electrical characteristics of said windings being such that substantially all the low-frequency currents localize in one winding and substantially all the high-frequency currents localize in the remaining winding, an external circuit connected to the winding which is the seat of low-frequency currents, a dynamo-electric phase-modifying machine connected in said external circuit, and damping means applied to said phase-modifying machine for minimizing the harmful effects of high-frequency currents on the commutation thereof.

5. The combination with a phase-modifying machine of the commutator type, of means for simultaneously supplying alternating currents of two frequencies to the armature member thereof, and damping means applied to said machine in order to largely suppress the higher-frequency currents.

6. The combination with a dynamo-electric machine of the commutator type, of means for simultaneously supplying alternating currents of two widely different frequencies to the armature thereof, and damping means applied to the field member for largely eliminating the harmful effects of the high-frequency currents upon commutation and in the production of heat.

7. A dynamo-electric machine of the induction type, including relatively rotating primary and secondary windings, means for energizing said primary winding in such manner that oppositely rotating component symmetrical fields are produced, whereby high-frequency and low-frequency currents will be generated in said secondary winding, a phase-advancer connected to a secondary winding and means on said phase-advancer for largely eliminating the harmful effects of the high-frequency currents on commutation and the production of heat.

8. A dynamo-electric machine of the induction type, including relatively rotating primary and secondary windings, means for energizing said primary winding in such manner that oppositely rotating component symmetrical fields are produced, whereby high-frequency and low-frequency currents will be generated in said secondary winding, a phase-advancer connected into said winding, said phase-advancer embodying damping means whereby the inductive effects of the high-frequency currents therein are largely eliminated, with substantially no modification of the inductive effects of the low-frequency currents.

9. A dynamo-electric machine of the induction type, including relatively rotating primary and secondary windings, means for energizing said primary winding in such manner that oppositely rotating component symmetrical fields are produced, whereby high-frequency and low-frequency currents will be generated in said secondary winding, a phase-advancer of the commutator type connected thereto, reactive means connected between said phase-advancer and said secondary winding for largely preventing the flow of said high-frequency currents to the phase-advancer, without material hindrances of the flow of said low-frequency currents, and damping means on the phase-advancer for largely eliminating the harmful inductive effects of said high-frequency currents without materially reducing the inductive effects of said low-frequency currents.

10. A dynamo-electric machine of the induction type, including relatively rotating primary and secondary members, means for energizing said primary member in such manner that oppositely rotating component symmetrical fields are produced, whereby high-frequency and low-frequency currents will be generated in said secondary member, means for providing two current-paths for said secondary currents, a dynamo-electric booster machine connected in circuit with one of said paths, and selective impedance means in one of said paths tending to segregate said secondary currents.

11. A dynamo-electric machine of the induction type, including relatively rotating primary and secondary members, means for energizing said primary member in such manner that oppositely rotating component symmetrical fields are produced, whereby high-frequency and low-frequency currents will be generated in said secondary member, means for providing two current-paths for said secondary currents, and a dynamo-electric booster machine connected in circuit with one of said paths, said booster machine being selectively responsive to currents of one of said frequencies.

12. A dynamo-electric machine of the induction type, including relatively rotating primary and secondary members, means for energizing said primary member in such manner that oppositely rotating component symmetrical fields are produced, whereby high-frequency and low-frequency currents will be generated in said secondary member, means for providing two current-paths for said secondary currents, and a dynamo-electric booster machine connected in circuit with one of said paths, said booster machine being provided with damping means for selectively reducing the field produced by said high-frequency currents.

13. The combination with a polyphase translating device tending to carry currents of two different frequencies, of a dynamo-electric booster machine of the commutator type connected in series-circuit relation thereto, said booster machine being provided with damping means for selectively reducing the field produced by said currents of higher frequency.

14. The combination with a polyphase translating device tending to carry currents of two different frequencies, of a dynamo-electric booster machine of a type in which the generated electromotive forces are dependent in magnitude and frequency upon the currents flowing therethrough, said booster machine being provided with damping means for selectively minimizing the effects of said currents of higher frequency.

In testimony whereof, I have hereunto subscribed my name this 13th day of May, 1919.

STANLEY G. NOTTAGE.